June 8, 1965 E. STEINER 3,188,483

FEEDBACK TRANSISTOR MODULATOR FOR FREQUENCY DIVISION AND FREQUENCY MULTIPLICATION

Filed Dec. 15, 1959 3 Sheets-Sheet 1

June 8, 1965 E. STEINER 3,188,483

FEEDBACK TRANSISTOR MODULATOR FOR FREQUENCY DIVISION AND FREQUENCY MULTIPLICATION

Filed Dec. 15, 1959 3 Sheets-Sheet 3

3,188,483

FEEDBACK TRANSISTOR MODULATOR FOR FREQUENCY DIVISION AND FREQUENCY MULTIPLICATION

Erhard Steiner, Munich, Germany, assignor to Siemens & Halske Aktiengesellschaft Berlin and Munich, a corporation of Germany Filed Dec. 15, 1959, Ser. No. 859,775
Claims priority, application Germany, Dec. 17, 1958, S 61,019
7 Claims. (Cl. 307—88.5)

This invention relates to a circuit arrangement for effecting frequency division and frequency multiplication and is particularly concerned with a harmonic frequency divider adapted for the division of frequencies according to a predetermined rational relation and at the input and output of which appear sinusoidal voltages.

The various objects and features of the invention will appear from the description which is rendered below with reference to the accompanying drawings. In the the drawings, FIG. 1 is a schematic representation of parts to aid in explaining the operation of known frequency dividers;

Among the known harmonic frequency dividers are the locked oscillator and the feedback modulator. The operating principles of both such devices shall be explained with reference to FIG. 1 in which the individual operations such as mixing, amplifying and frequency multiplication are represented separately.

Figure 1:
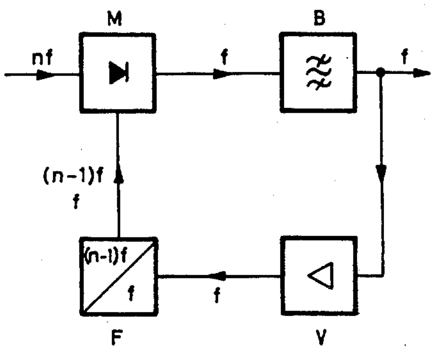

In FIG. 1, the input voltage with a frequency $nf$ which is to be divided is mixed in a modulator M with the feedback voltage with the frequency $(n-1)f$. As a modulation product (difference frequency) there will appear among the frequency $f$ which is divided by $n$ and which is filtered out in the band filter B. The voltage with the frequency $f$ is amplified in the amplifier V and is conducted to the frequency multiplier F which feeds the harmonic oscillation with the frequency $(n-1)f$ back to the modulator M.

As will be presently shown, the so called loop amplification for the basic oscillation with the divided frequency $f$ is in the absence of the input voltage with the frequency $nf$ which is to be divided, decisive for the properties of a frequency divider. To define the loop amplification, the feedback circuit must be assumed to be open at some point; the loop amplification is then the ratio of the voltage at the output of this open point to a voltage conducted to the input thereof.

In the locked oscillator, the amplification, mixing and frequency multiplication are effected in the oscillator tube, the steepness and curvature of the characteristic curve of the tube and the position of the working point being decisive. The locking effect is based primarily upon the fact that the input frequency $nf$ which is to be divided with the harmonic $(n-1)f$, supplies as a mixing product the frequency $f$ (harmonic oscillation). The feedback circuit is dimensioned so that the loop amplification for the basic frequency $f$ is in the absence of the control voltage with the frequency $nf$, greater than 1. The locked oscillator accordingly oscillates in the absence of the control frequency with its inherent frequency which more or less deviates from the desired frequency.

The feedback modulator or feedback mixing divider exhibits particularly good stability. Mixing and frequency multiplication are in known embodiments effected separating, making it possible to filter out at the output of the frequency multiplier F (FIG. 1) the frequency $(n-1)f$, which is particularly important for the division, and to feed such frequency preferentially back to the modulator M. In an ideal feedback mixing divider, the loop amplification for the basic frequency $f$ is in the absence of the frequency $nf$ equal to zero, since the basic oscillation is shortcircuited by the filter circuit at the output of the frequency multiplier F. The division operation is accordingly instantly interrupted upon disappearance of the controlling input voltage with the frequency $nf$, that is, no false frequency will be given off. A disadvantage resides however in the fact that an auxiliary voltage must in some circumstances be supplied upon starting operation so as to permit excitation of the frequencies $f$ and $(n-1)f$.

The invention utilizes the principle of the feedback modulator. The object of the invention is to simplify the known circuits and to improve them so as to make it possible to effect frequency division and frequency multiplication in a predetermined rational relation $$\frac{m}{n}$$

The circuit arrangement according to the invention employs as a distinguishing feature two transistors between the base electrodes of which is arranged a resonance circuit tuned to the frequency $f$, such resonance circuit effecting the feedback, the controlling currents with the frequency $nf$ being conducted in phase to the emitter and the base electrodes while conducting thereto in opposed phase the feedback currents with the divided frequency $f$, and the output currents with the frequency $f$ and its harmonic frequencies being obtained at the collectors.

According to another feature of the invention, the feedback path is dimensioned so that the loop amplification for the basic frequency $f$ lies, in the absence of the controlling input voltage with the frequency $nf$, between 0 and 1 and preferably at 0.8 and 0.9, thus resulting in easy initial oscillation of the frequency divider while the dividing operation is instantly interrupted upon disappearance of the controlling input voltage. There is, accordingly, certainty that the input and output frequencies are always synchronized. The frequency divider according to the invention therefore lies, so far as the loop amplification is concerned, midway between the feedback modulator and the locked oscillator, in which the loop amplification is zero or greater than 1.

The particular kind of synchron-beat circuit regarding the frequency $nf$ which is to be divided and the counter-beat circuit regarding the divided frequency $f$ results in the particular advantage that the frequency $nf$ which is to be divided and also the harmonic frequencies thereof are suppressed in the output transformer and that the divided frequency $f$ and its harmonic frequencies do not appear in the input circuit. Moreover, the counter-beat circuit due to formation of the difference and the sum of the collector currents permits separate removal of the divided frequency $f$ and its odded numbered harmonic frequencies and also its even numbered harmonic frequencies, that is, it is possible to obtain frequency division and frequency multiplication in a predetermined rational relation $$\frac{m}{n}$$

in accordance with the equation $$(nf)\frac{m}{n}=mf$$

($m$ and $n$ being whole numbers).

The input circuit and the feedback circuit are substantially uncoupled from the output circuit owing to the counter-beat circuit and the feed back in the emitter-base circuit. Accordingly, the output can without difficulties be tuned to a multiple of the divided frequency $f$ without disturbing the operation of the frequency divider.

An embodiment of the invention will now be described with reference to FIGS. 2 to 4.

Figure 2:
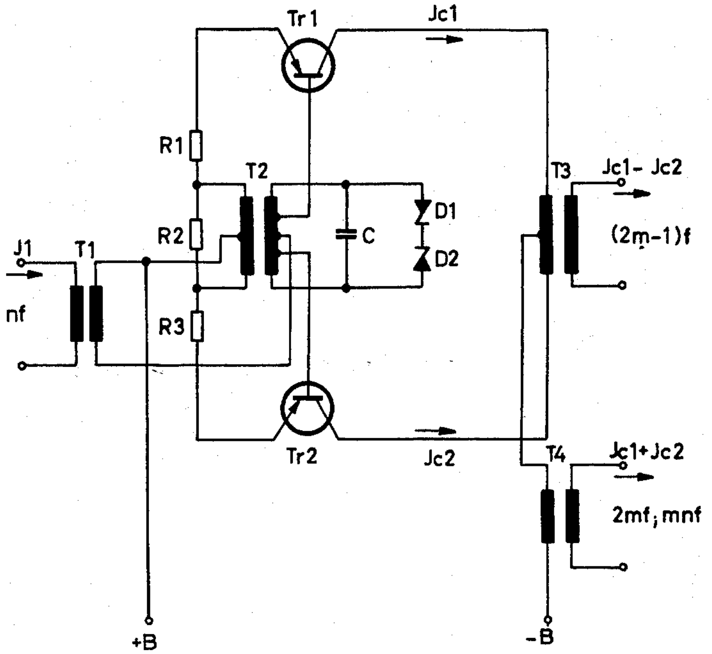
FIG. 2 shows an arrangement according to the invention.

The embodiment shown in FIG. 2 comprises two p-n-p transistors $Tr1$ and $Tr2$. The input voltage with frequency $nf$ is by way of an input transformer T1 supplied to center taps of the primary and secondary windings of a transformer T2. Two taps lying symmetrical to the center tap of the secondary winding of the transformer T2 are respectively connected with the base electrodes of the two transistors $Tr1$ and $Tr2$, while the ends of the primary winding which is loaded with a resistor R2, are by way of resistors R1 and R3 respectively connected with the emitter electrodes of the two transistors. The controlling input currents with the frequency $nf$ are in this manner supplied to the transistors $Tr1$ and $Tr2$ in phase, the transformer T2 being for these currents magnetically ineffective. The two transistors accordingly operate in regard to the frequency $nf$ which is to be divided in synchron-beat but in regard to the divided frequency $f$ in counter-beat.

The secondary winding of the transformer T2 is by means of the capacitor C tuned to the divided frequency $f$ and so polarized that regeneration is effected at this frequency. Two serially connected oppositely polarized Zener diodes D1 and D2 are disposed in parallel with the capacitor C, such diodes serving limitation purposes. The amount of the regeneration or feedback is adjusted by means of the resistors R1, R2, R3 in the emitter circuit, such resistors constituting an ohmic voltage divider and effecting an alternating and direct current feedback coupling. The resistivity of the resistor R2, lying in parallel to the primary winding of the feedback coupling transformer T2, is so low that random scattering and variation as to time of the parallel connected transformed loss resistance of the oscillation circuit T2 and the transformed base-emitter input impedance of the transistors have upon initiation of the oscillation—when the limitation is not yet effective—no effect on the magnitude of the feedback coupling factor. The exact value of R2 is such that a reliable initiation of oscillation is secured at the available controlling input voltage with the frequency $nf$ and that the frequency divider cannot continue to oscillate upon cessation of the input voltage. As already mentioned, this is the case when the loop amplification for the frequency $f$ lies, in the absence of the input voltage with the frequency $nf$, between 0 and 1 and preferably at 0.8 to 0.9. The loop amplification for the frequency $f$ will increase to a value greater than 1 only in the presence of the input voltage and corresponding to the mixing steepness of the transistors, since the so called linear amplification is thereby increased by the amount of mixing amplification.

The limitation of the feedback coupling voltage at the oscillation circuit T2, C affords particular advantages which would not appear by a limitation at another point, for example, at the output. The arrangement first of all prevents limitation by overloading of the emitter-current-/collector voltage characteristic line, thus resulting in very slight dependence of the output voltage on the operating voltage and on alterations of the transistor data which may, for example, occur as a consequence of temperature fluctuations. Moreover, excessive increase of the linear amplification for the frequency $f$ in relation to the mixing amplification is likewise avoided, which increase would impede the secure synchronization of the input and output frequency, which is based upon the locking effect and therewith upon a mixing amplification as high as possible. It is further possible by suitable choice of the limitation of the feedback voltage with the frequency $f$ in relation to the input voltage with the frequency $nf$, to adjust for any desired division ratio $n$ an optimum current flow angle of the collector current half waves.

In the case of Zener diodes, the steep characteristic curve portion which adjoins the blocking voltage range, is utilized for the limitation. Rectifiers operating without the Zener effect can be used in place of these diodes but such rectifiers will require a particular bias voltage.

The difference of the collector currents $Jc1$ and $Jc2$ of the two transistors $Tr1$ and $Tr2$ becomes effective in the counter-beat output transformer T3. Accordingly, at the output of the transformer T3 will only appear the divided frequency $f$ and its odd numbered harmonic frequencies $3f$, $5f$, etc.; expressed generally, there will appear output frequencies of the form $(2m-1)f$, $m$, being thereby a whole number.

The sum of the collector currents $Jc1$ and $Jc2$ of the two transistors $Tr1$ and T2 will become effective in the output transformer T4, at the output of which will appear the even numbered harmonic frequencies of the divided frequency $f$, that is, $2f$, $4f$, etc., and also the divided frequency $nf$ and its harmonic frequencies $2nf$, $3nf$, etc.; expressed generally, there will result output frequencies of the form $2mf$ and $mnf$, whereby $m$ and the division ratio $n$ are whole numbers.

The direct emitter currents are conducted to the two p-n-p-transistors $Tr1$ and $Tr2$ from the positive terminal +B of the direct voltage source over the center tap of the primary winding of the feedback coupling transformer T2. The secondary winding of the input transformer T1 is accordingly traversed only by low base currents, so that a low input load will suffice for the triggering of the transistors. The collector currents $Jc1$ and $Jc2$ flow over the center tap of the primary winding of the counter-beat output transformer T3 and the primary winding of the output transformer T4 and back to the negative terminal —B of the direct voltage source.

The working point of the transistors $Tr1$ and $Tr2$ is advantageously placed at the base point of the collector curernt-/emitter-base voltage characteristic line, that is, the transistors are triggered in B-operation, and the direct current loss of the transistors is therefore low. As mentioned before, the frequency divider requires a low input load but delivers a high output effect, thus resulting in very good efficiency.

Figure 3:
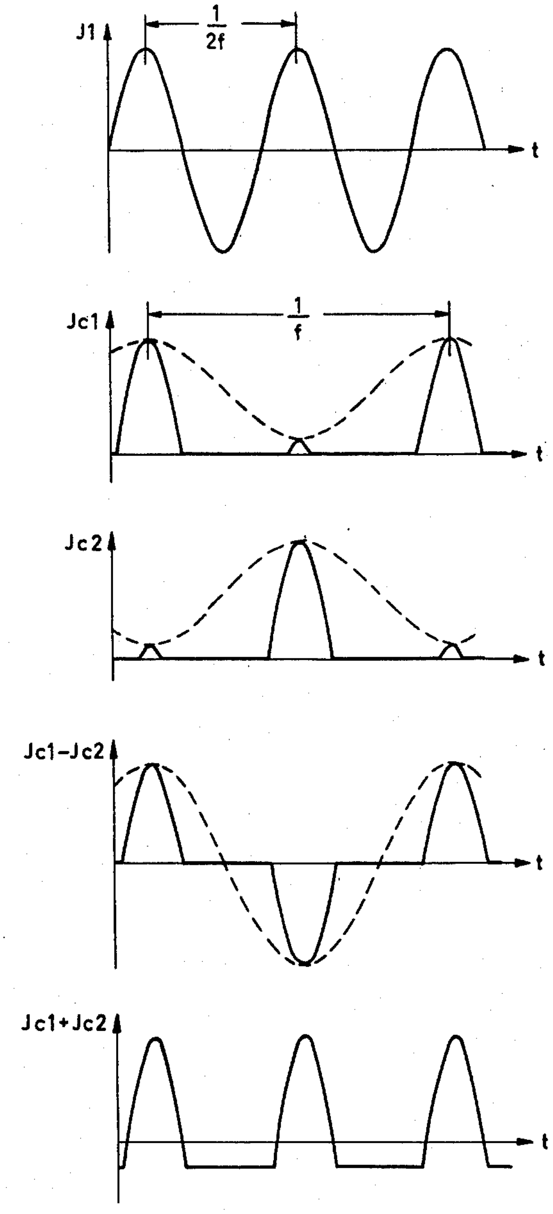
FIG. 3 shows current curves appearing in the case of a division ratio $n=2$.
Figure 4:
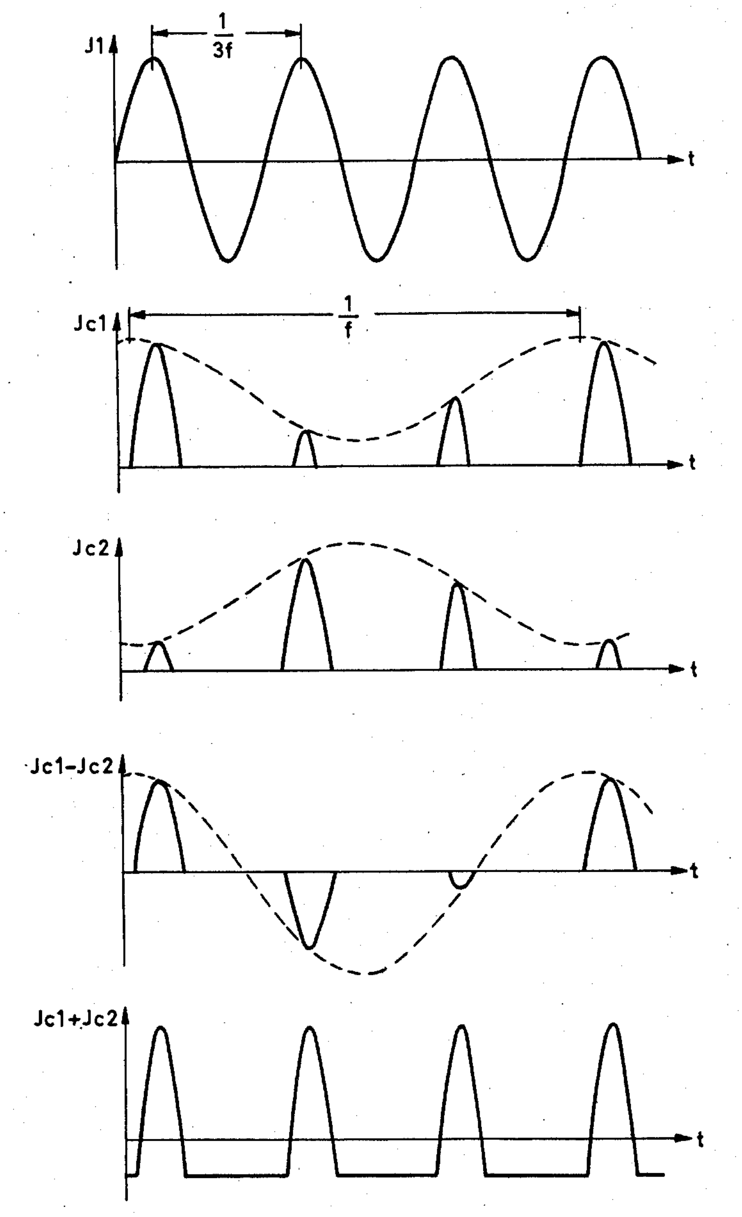
FIG. 4 shows current curves appearing in the case of a division ratio $n=3$.

FIGS. 3 and 4 represent the sinusoidal input current J1, collector currents $Jc1$ and $Jc2$, and the output currents $Jc1-Jc2$ and $Jc1+Jc2$ in the case of a division ratio $n=2$ (FIG. 3) and $n=3$ (FIG. 4), respectively. The collector current half waves $Jc1$ and $Jc2$ with the frequency $nf$ are in phase; their current flow angle is smaller than 90° and becomes smaller with increasing division ratio. The approximately sinusoidal envelopes of the collector currents $Jc1$ and $Jc2$ with the frequency $f$ are in opposite phase. The curves clearly show the development of the frequencies $(2m-1)f$ in the difference current $Jc1-Jc2$ and the frequencies $2mf$ and $mnf$ in the sum current $Jc1+Jc2$.

Tubes or other controllable resistors may take the place of the transistors. In the case of tubes, the cathode will correspond, for example, to the emitter, the control grid to the base, and the anode to the collector.

Changes may be made within the scope and spirit of the appended claims which define what is believed to be new and desired to have protected by Letters Patent.

I claim:

1. Circuit arrangement for effecting frequency division and frequency multiplication in a predetermined rational relation by the use of a feedback modulator in which is formed the difference from the frequency to be divided and a harmonic of the divided frequency, comprising two transistor operating in push-pull relation, means connected between the base electrodes of said transistors in push-pull arrangement and forming a resonance circuit tuned to the divided frequency, means for conducting to the emitter and base electrodes in phase the control currents with the frequency to be divided while, in cooperation with said resonance circuit, conducting to said transistors in opposed phase the feedback currents with the divided frequency, and means for obtaining from the collectors of said transistors the output currents with the divided frequency and the harmonic frequencies thereof.

2. Circuit arrangement according to claim 1, comprising a counter-beat transformer for obtaining the currents with the divided frequency and the odd numbered harmonic frequencies thereof by formation of the difference of the collector currents of said transistors.

3. Circuit arrangement according to claim 2, comprising a further transformer for obtaining the currents with the even numbered harmonics of the divided frequency by formation of the sum of the collector currents of said transistors.

4. Circuit arrangement for effecting frequency division and frequency multiplication in a predetermined rational relation by the use of a feedback modulator in which is formed the difference from the frequency to be divided and a harmonic of the divided frequency, comprising two transistors, a resonance circuit tuned to the divided frequency said resonance circuit comprising a transformer having center-tapped primary and secondary windings, said transformer being tuned to the divided frequency and effecting the feedback, taps disposed symmetrical to a center tap of the secondary winding of said transformer and means for connecting said symmetrically disposed taps with the respective base electrodes of said transistors, means including an input transformer for connecting the frequency which is to be divided to the center taps of the respective primary and secondary windings of said first named transformer, a load resistor connected in parallel to the primary winding of the first named transformer, and resistor means respectively connected with said load resistor and in turn connected with the respective emitter electrodes of said transistors, whereby the control currents with the frequency to be divided are conducted to the emitter and base electrodes of the transistors in phase and the feedback currents with divided frequency are conducted thereto in opposed phase, and means for obtaining from collectors of said transistors the output currents with the divided frequency and the harmonic frequencies thereof.

5. Circuit arrangement according to claim 4, comprising two serially connected oppositely polarized diodes connected in parallel with said resonance circuit for limiting the voltage at the first named transformer.

6. Circuit arrangement according to claim 4, wherein the working point of the respective transistors lies substantially at the base of the corresponding collector current-/emmiter-base voltage characteristic line.

7. Circuit arrangement according to claim 4, wherein the feedback is so dimensioned that the loop amplification for the divided frequency lies, in the absence of the frequency which is to be divided, between 0 and 1 and preferably at 0.8 to 0.9.

References Cited by the Examiner

UNITED STATES PATENTS

| | | | |
|---|---|---|---|
| 2,122,401 | 7/38 | Armstrong | 328—156 |
| 2,146,091 | 2/39 | Peterson | 328—17 |
| 2,162,806 | 6/39 | Fay | 328—16 |
| 2,184,945 | 12/39 | Reinartz | 328—16 |
| 2,303,575 | 12/42 | Nelson | 328—15 |
| 2,738,423 | 3/56 | Sziklai | 328—17 |
| 2,832,051 | 4/58 | Raisbeck | 332—52 |
| 2,849,615 | 8/58 | Gustafson | 331—112 |
| 2,896,146 | 7/59 | Jenkins | 331—112 |
| 2,913,670 | 11/59 | Laine | 328—15 |
| 2,926,244 | 2/60 | Stryker | 328—15 |
| 2,928,955 | 3/60 | Herzog | 307—88.5 |
| 3,061,797 | 10/62 | Grenier | 307—88.5 |

FOREIGN PATENTS

| | | |
|---|---|---|
| 165,635 | 10/55 | Australia. |
| 1,125,813 | 7/56 | France. |

JOHN W. HUCKERT, *Primary Examiner.*

GEORGE N. WESTBY, *Examiner.*